(12) United States Patent
Youn et al.

(10) Patent No.: US 6,466,623 B1
(45) Date of Patent: *Oct. 15, 2002

(54) METHOD AND APPARATUS FOR MOTION ESTIMATION FOR HIGH PERFORMANCE TRANSCODING

(75) Inventors: Jeongnam Youn, Seattle; Ming-Ting Sun, Mercer Island, both of WA (US); Chia-Wen Lin, Hsinchu (TW)

(73) Assignee: Industrial Technology Research Institute (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,826

(22) Filed: Mar. 26, 1999

Related U.S. Application Data

(60) Provisional application No. 60/079,754, filed on Mar. 27, 1998.

(51) Int. Cl.[7] ............................. H04N 7/26; H04N 7/36
(52) U.S. Cl. ........................... 375/240.16; 375/240.26
(58) Field of Search .................. 375/240.11–240.17, 375/240.26

(56) References Cited

U.S. PATENT DOCUMENTS

| | | | | |
|---|---|---|---|---|
| 5,729,293 A | * | 3/1998 | Keesman | 348/401 |
| 5,764,298 A | * | 6/1998 | Morrison | 348/500 |
| 5,940,130 A | * | 8/1999 | Nilsson et al. | 348/416 |
| 6,058,143 A | * | 5/2000 | Golin | 375/240 |
| 6,081,295 A | * | 6/2000 | Adolph et al. | 348/405 |
| 6,144,698 A | * | 11/2000 | Poon et al. | 375/240 |
| 6,226,338 B1 | * | 5/2001 | Assuncao | 375/240.26 |

FOREIGN PATENT DOCUMENTS

GB    WO 99/29113   * 10/1999   ............ H04N/7/26

OTHER PUBLICATIONS

A. Eleftheriadis and D. Anastassiou, "Constrained And General Dynamic Rate Shaping Of Compressed Digital Video," ICIP '95, pp. 396–99, 1995.

H. Sun, W. Kwok, and J.W. Zdepski, "Architectures for MPEG Compressed Bitstream Scaling," IEEE Trans. on Circuits and Systems for Video Technology, vol. 6, No. 2, pp. 191–99, Apr. 1996.

P.N. Tudor and O.H. Werner, "Real–Time Transcoding of MPEG–2 Video Bit Streams," International Broadcasting Convention, Conference Publication No. 447, pp. 296–301, 12–16 Sep., 1997.

P. Assuncao and M. Ghanbari, "Post–processing of MPEG2 Coded Video For Transmission At Lower Bit Rates," ICASSP '06, vol. 4, pp. 1998–2001, May 1996.

P. Assuncao and M. Ghanbari, "Optimal Transcoding of Compressed Video," ICIP '97, pp. 739–42, 1997.

International Telecommunications Union, Draft ITU–T SG–15 Recommendation H.263, *"Video Coding for Low Bitrate Communication,"* May 1996.

(List continued on next page.)

*Primary Examiner*—Andy Rao

(57) ABSTRACT

Methods and systems for generating motion vectors for re-encoding video signals are disclosed. The motion vector is determined by the sum of a base motion vector and a delta motion vector. In the case of no frame-skipping, the base motion vector is the incoming motion vector. In the case of frame skipping, the base motion vector is the sum of the motion vectors of the incoming signal since the last re-encoded frame and the current frame. The delta motion vector is optimized by a minimum Sum of the Absolute Difference by searching over a smaller area than if searching for a new motion vector without a delta motion vector. These methods and systems may be used to improve re-encoding digital video signals.

40 Claims, 13 Drawing Sheets

OTHER PUBLICATIONS

International Telecommunications Union, ITU Telecommunications Standardization Sector LBC–95, ITU–T SG–15, "*Video Codec Test Model, TMN5*," Jan. 1995.

N. Bjork and C. Christopoulos, "Transcoder Architectures For Video Coding, " IEEE Trans. on Consumer Electronics, vol. 44, No. 1, pp. 88–98, Feb. 1998.

* cited by examiner

METHOD AND APPARATUS FOR MOTION ESTIMATION FOR HIGH PERFORMANCE TRANSCODING

This application claims benefit of provisional application No. 60/079,754 filed Mar. 27, 1993.

BACKGROUND OF THE INVENTION

1. Field of the Invention

This invention relates generally to digital video compression and, in particular, to encoding a previously encoded digital video signal, also known as transcoding.

2. Description of the Related Art

Consumer electronic equipment increasingly uses digital video technology. Because it improves picture quality, this digital technology is superior to the analog technology currently used in most commercial broadcasting and traditional VCRs. With digital video, motion picture image information is stored in the form of bits of digital data, i.e. 0s and 1s. This information may be transmitted in the form of a stream of bits, also known as a "digital video signal." Conventional digital video signals, however, require undesirably wide channels for transmission and undesirably large amounts of memory for storage. To avoid these problems, digital video signals are often "compressed" or "encoded." Compression and encoding allow the same video information (or nearly the same information) to be represented using fewer bits. These encoding techniques have allowed for technical advances in the fields of digital broadcast television, digital satellite television, video teleconferencing, and video electronic mail.

Digital video compression reduces the number of bits by removing redundant information, without seriously affecting the quality of the video. Standard video compression techniques remove spatial redundancy within a video frame and remove temporal redundancy between video frames. To remove spatial redundancy, encoders commonly use a Discrete Cosine Transform (DCT), which is widely known and understood. To remove temporal redundancy, encoders commonly use motion estimation, which is also widely known and understood.

With regard to motion estimation, the images in a digital video usually do not change much within small time intervals, i.e., adjacent frames include a great deal of redundant information. Thus, motion-estimation takes advantage of this redundancy and encodes a video frame based on other video frames temporally close to it. For example, in a particular movie scene, the background trees (outdoor scene) or furniture (indoor scene) may not move. Therefore, video information related to the background may not necessarily have to be transmitted multiple times, reducing the number of bits to be transmitted or stored. On the other hand, if the camera is panning, the background may "move" on the video screen. In this case, it is possible to avoid transmitting background information. Instead of encoding and transmitting the background information multiple times, it is possible to encode it once and subsequently transmit information related to its movement. Techniques related to this process are called motion estimation.

A device known as a transcoder may employ motion estimation. A transcoder reduces the bit-rate of an already compressed video bit-stream, allowing the bit stream to be transmitted through a narrower channel. Transcoders are often used by video services that operate over more than one type of network. In this situation, the different networks may have different bandwidths, thus each end-user may require a different Quality of Service (QoS). Therefore, "gateways" between the networks employ transcoders to adapt video bit-rates to different end-users on different networks.

There are two well known types of transcoders. First, the simplest type is an "open-loop transcoder." In this type of transcoder, the incoming bit-rate is reduced by the well-known mathematical technique of truncating or re-quantizing the DCT coefficients. In other words, the encoded bits that represent the higher quality aspects of the video are discarded. Because this transcoding is done in the "coded domain," i.e., it is done without decoding the signal, these transcoders are simple and fast. Open-loop transcoding, however, produces increased distortion caused by a "drift" due to the mismatched reconstructed pictures in the encoder and the decoder. This distortion may result in an unacceptable video quality in many applications.

A second, more complicated, type of transcoder is a "drift-free" transcoder. It operates by decoding the incoming coded video and then re-encoding the video at a lower bit-rate. Using this method, it is possible to take advantage of useful information in the encoded video arriving at the transcoder, such as picture type, motion vectors, quantization step-size, bit-allocation statistics, etc. It is possible to construct transcoders with different complexity and performance with regard to coding efficiency and video quality.

Traditionally, the second type of transcoding does not employ motion estimation for two reasons. First, transcoders must operate very quickly and motion estimation is computationally complex and thus expensive to implement. Second, it is widely assumed that re-using motion vectors extracted from the incoming encoded video is as good as performing a new motion estimation, thus motion estimation is not performed in the transcoder. In some applications, however, this reuse scheme introduces significant quality degradation because reused motion vectors are not the optimal motion vectors.

Thus, it is thus desirable to provide a method and apparatus of motion estimation when re-encoding a digital video signal that is not computationally complex, thereby providing an improved video quality.

SUMMARY OF THE INVENTION

The advantages and purposes of the invention are set forth in part in the description which follows, and in part are obvious from the description, or may be learned by practice of the invention. The advantages and purposes of the invention are realized and attained by means of the elements and combinations particularly pointed out in the appended claims.

To attain the advantages and in accordance with the purpose of the invention, as embodied and broadly described herein, the invention comprises a method and apparatus of re-encoding digital video from a previously encoded digital video having at least one input motion vector. The method comprises the steps of determining a base motion vector from the at least one input motion vector, generating a delta motion vector, generating a new motion vector that is the sum of the base motion vector and the delta motion vector, and re-encoding the previously encoded digital video using the new motion vector.

The summary and the following detailed description should not restrict the scope of the claimed invention. Both provide examples and explanations to enable others to practice the invention. The accompanying drawings, which form part of the detailed description, show several embodiments of the invention and, together with the description, explain the principles of the invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

The following description of the embodiments of this invention refers to the accompanying drawings. Where appropriate the same reference numbers in different drawings refer to the same or similar elements.

A. Overview of Encoding/Decoding

Before discussing transcoders and this invention, it is first necessary to describe digital video signals, and the process of encoding and decoding digital video signals. This is necessary because of the close relationship between encoding, decoding, and transcoding.

As is well known in the art, a digital video signal is conceptually divided into four components for encoding: frames, pixels, blocks, and macroblocks. A frame is a single still image in a sequence of images. Displaying this sequence in quick succession creates the illusion of motion. A pixel (picture element) is a single point in a frame. Television and computer monitors display frames by dividing the display screen into thousands (or millions) of pixels, arranged in rows and columns. The pixels are so close together that they appear connected. Frames are divided into macroblocks, which are rectangular groups of pixels. Macroblocks are the units for motion-estimation encoding. Macroblocks in turn can be divided into blocks. There are two types of blocks: luminance (brightness) blocks and chrominance (color) blocks. Blocks are used for DCT encoding.

Figures 1A, 1B:
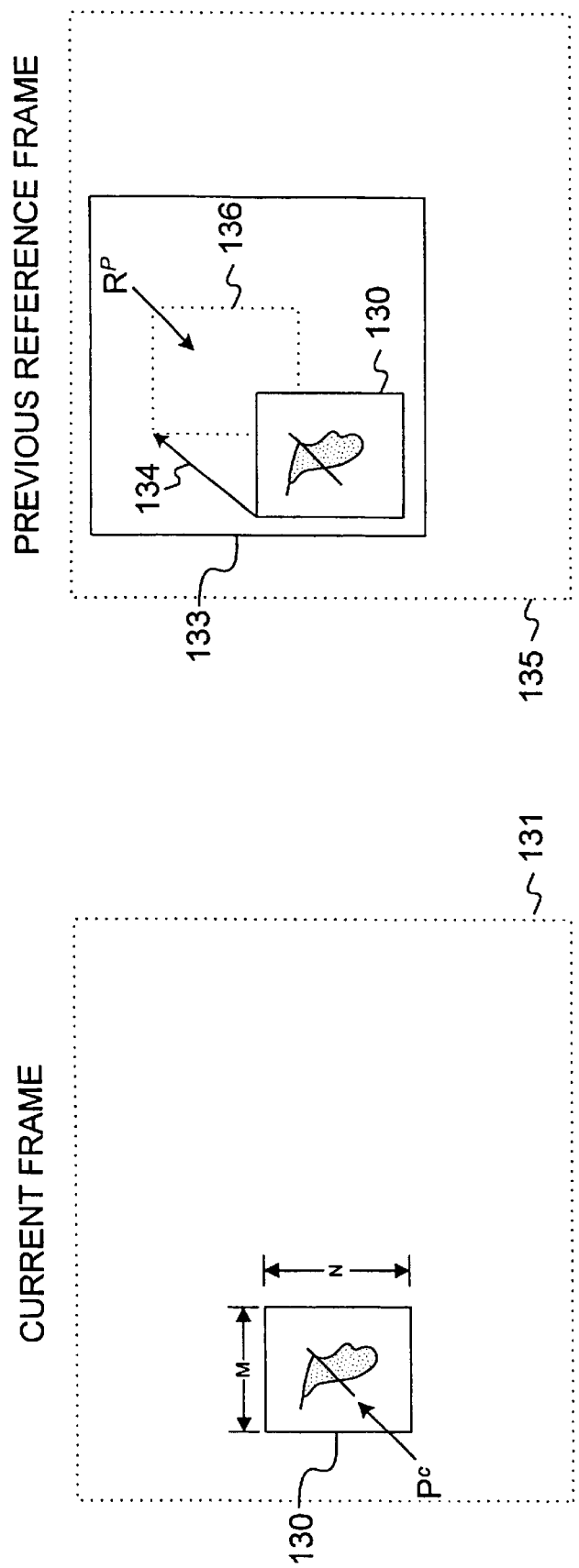
FIGS. 1A and 1B are block diagrams illustrating motion estimation that is prevalent in the prior art.

Video encoding removes redundant information from the digital video signal. To remove temporal redundancy, encoders commonly use motion estimation. FIGS. 1A and 1B are block diagrams illustrating motion estimation prevalent in the prior art. FIG. 1A shows an image in a current macroblock 130 in a current frame 131. During motion-estimation, the system compares current macroblock 130 to a previous reference frame 135 over an area S 133, as shown in FIG. 1B. The system searches the previous reference frame 135 to find a closest match 136 for current macroblock 130. Closest match 136 in the previous reference frame 135 is in the position of current macroblock 130 in current frame 131, but displaced by a motion vector 134. Current macroblock 130 is M pixels by N pixels. $P^C$ is a pixel value in the current macroblock 130 and $R^P$ is a pixel value in the closest match 136.

Figure 2:
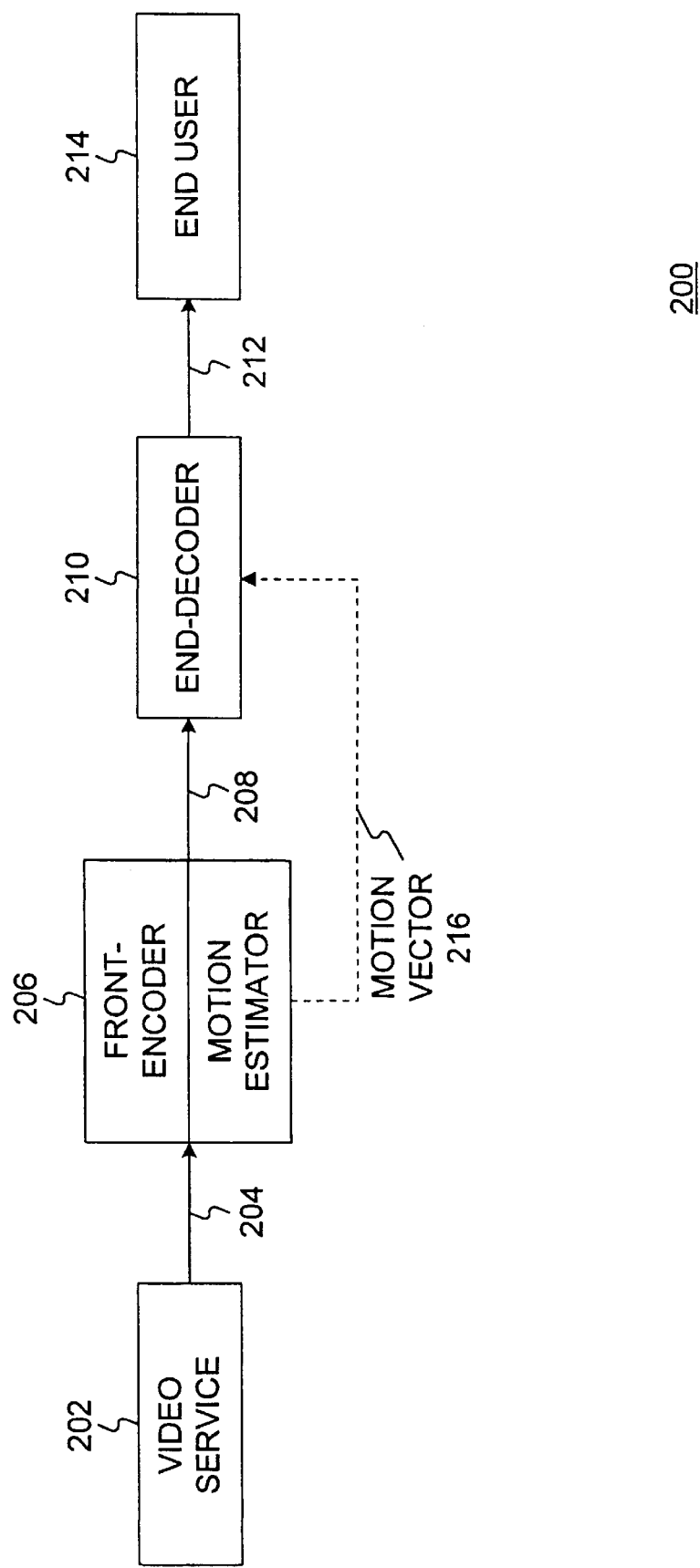
FIG. 2 is a diagram of major components of an environment, prevalent in the prior art, that uses a front-encoder and an end-decoder.

FIG. 2 is a block diagram of major components of an environment, prevalent in the prior art, that uses an encoder and decoder. A video service 202 creates a digital video signal 204 that needs to be compressed for transmission purposes. A front-encoder 206 uses motion estimation to create an encoded video signal 208 along with a motion vector signal 216. Encoded video signal 208 is transmitted over a channel, such as through a network (not shown), to an end-decoder 210. End-decoder 210 decodes signal 208 and generates a decoded signal 212 for end-user 214. End-decoder 210 uses the same motion vector signal 216, which front-encoder 206 generated and transmitted to decoder 210 through an overhead channel (not shown).

Figure 3:
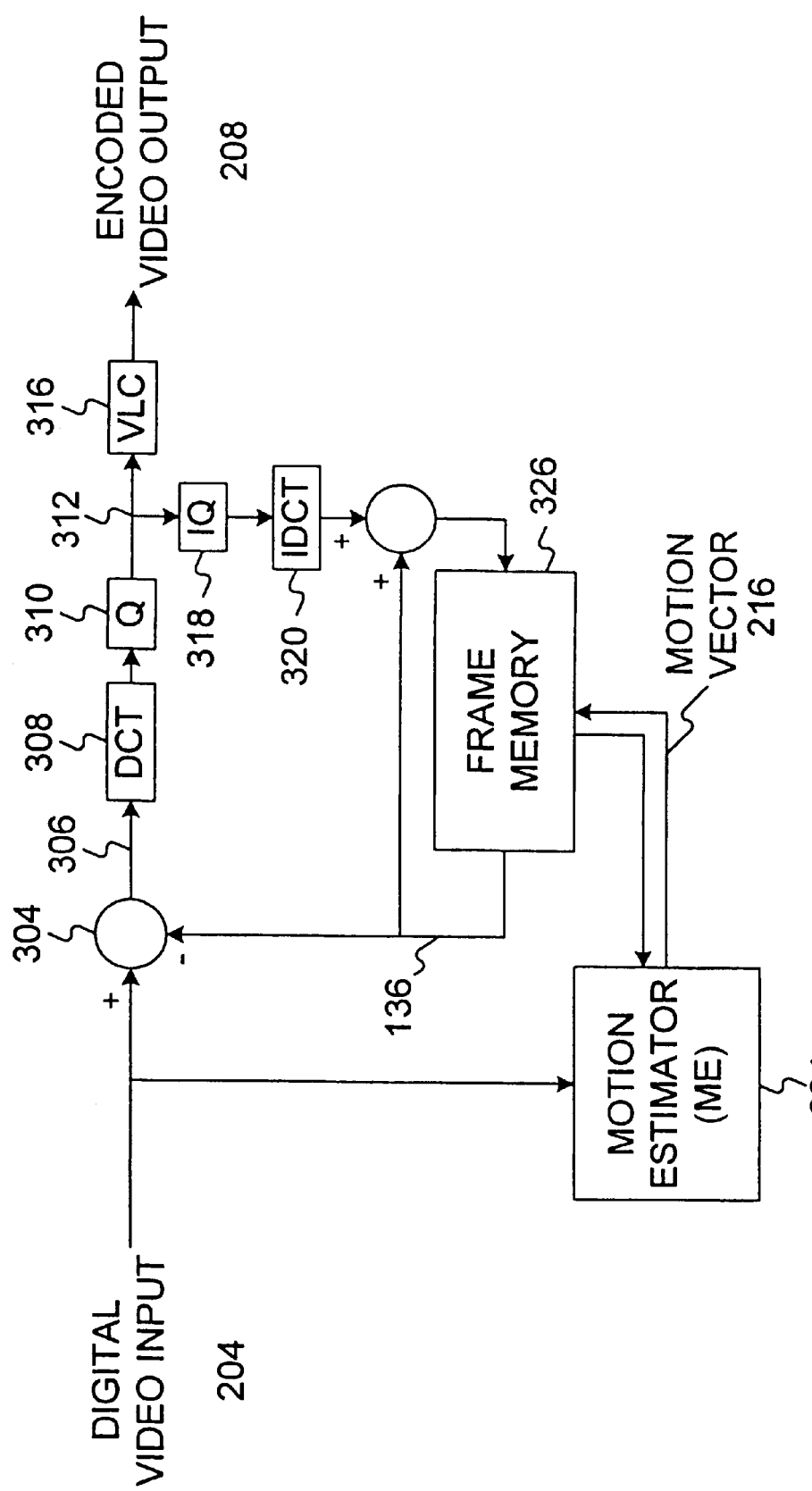
FIG. 3 is a block diagram of the major components of the front-encoder shown in FIG. 2 that uses motion estimation.

FIG. 3 is a block diagram of the major components of front-encoder 206 of FIG. 2 that uses motion estimation. A first frame signal from digital video input 204 with matching block 136 enters encoder 206 and is transformed at DCT 308 and quantized at 310 to generate a coded signal 312. Coded signal 312 is variable-length coded (VLC-ed) at 316 to generate encoded digital video output 208. Variable length coding and decoding is prevalent in the prior art. Coded signal 312 is also inverse quantized at 318, inverse DCT-ed at 320, and stored in a frame memory 326.

A second frame signal from digital video input 204 with current macroblock 130 then enters encoder 206. Before this macroblock is DCT-ed at 308, however, the encoder performs a motion estimation (described below in detail) at 324 on the second frame signal and the frame signal stored at 326, which generates a motion vector 134 that is part of motion vector signal 216. Frame memory 326 outputs matching macroblock 136 to a summer 304. Matching block 136 is then subtracted from current macroblock 130 at summer 304 to generate a difference signal 306. Then, difference signal 306 is DCT-ed at 308, quantized at 310, and VLC-ed at 316, and outputted by encoder 206. The output signal 208 is encoded video. This process continues for each macroblock in the second frame. Frame memory 326 is supplied with what will be the next reconstructed reference frame to be used for a third frame from digital video input 204 that enters encoder 206.

After the first frame, each subsequent frame is reconstructed by inverse quantizing at 318, inverse DCT-ing at 320, and adding corresponding matching macroblocks from frame memory 326 (the same matching macroblock that was subtracted at summer 304). Each motion vector is transmitted in motion vector signal 216.

Referring back to FIGS. 1A and 1B, most video coding standards, including MPEG, H.261, and H.263, perform motion estimation on macroblocks based on the Sum of Absolute Difference (SAD) fiction. As is taught in the prior art, in order to obtain motion vector 134 for current macroblock 130, most encoders search for a matching block 136 that results in a minimum SAD within a predefined search area S 133 in previous reference frame 135. Thus, the motion vector, MV1 134, of a general motion estimation encoder is obtained by $$MV1 = arg \min_{(m,n) \in S} SAD_f(m, n)$$
$$= arg \min_{(m,n) \in S} \sum_i^M \sum_j^N |P_f^c(i, j) - R_f^p(i+m, j+n)|,$$

where m and n are components of the motion vectors within predefined search area S. M and N are the dimensions of any macroblock and the largest possible values of i and j, respectively. $P_f^c(i,j)$ and $R_f^p(i+m,j+n)$ represent a pixel in the current frame and a pixel displaced by (m, n) in the previous reference frame, respectively. The superscript "c" or "p" represents the current or previous frame, respectively. The subscript "f" indicates that this is the first-stage or front-end encoder.

Figure 4:
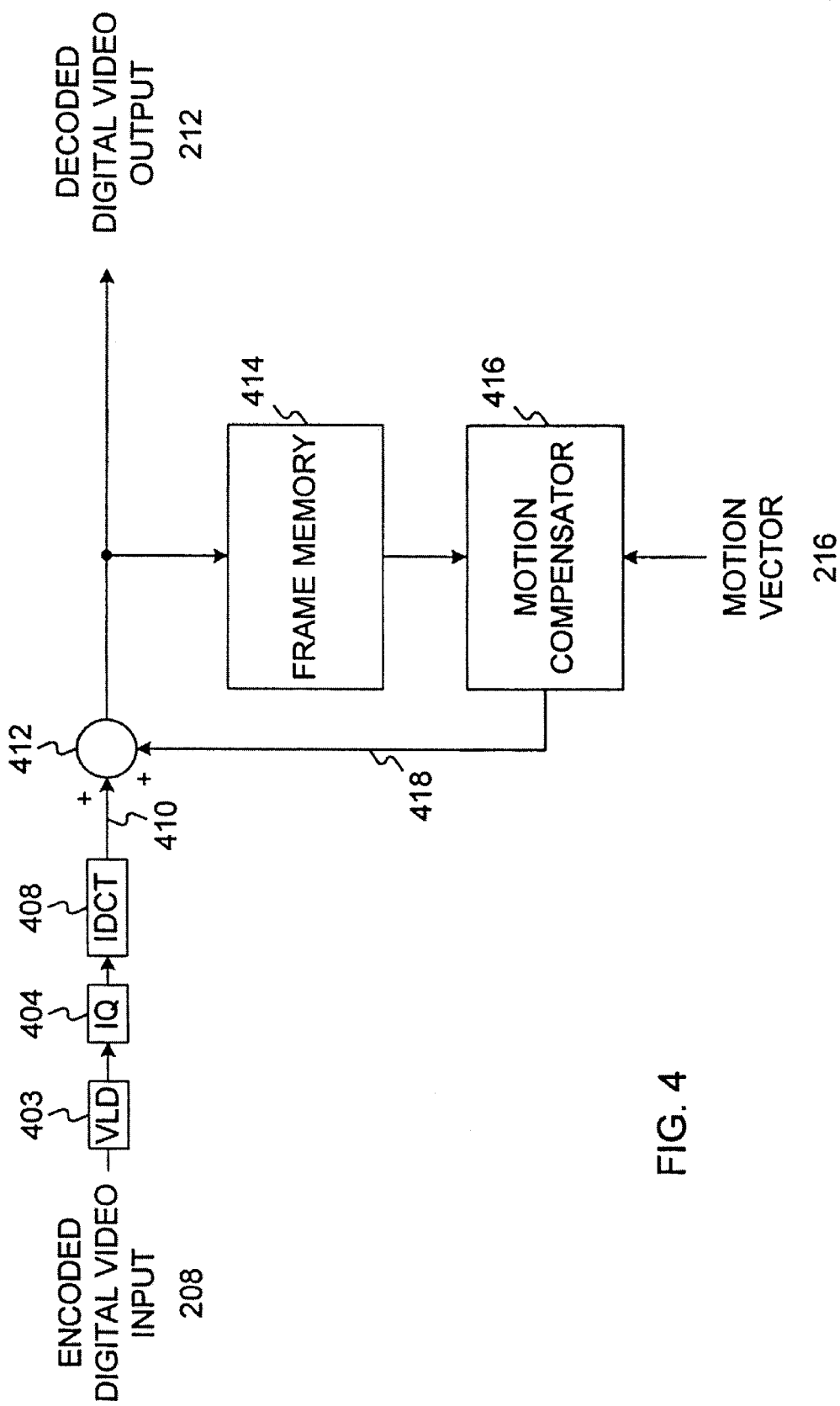
FIG. 4 is a block diagram of the major components of the end-decoder shown in FIG. 2 that uses motion compensation.

FIG. 4 is a block diagram of the major components of end-decoder 210 shown in FIG. 2 using motion compensation. Encoded input 208 is variable length decoded at 403, inverse quantized at 404, and inverse discrete cosine transformed at 408 to form a signal 410. A summer 412 adds to signal 410 the same macroblock signal 418 that had been subtracted from it in encoder 200, thus providing a decoded digital video output signal 212. The decoder does this by using the frame memory 414 and motion compensator 416. Motion compensator 416 uses the motion vector signal 216 generated by front-encoder 206. Motion vector signal 216 is transmitted to the end-decoder on an overhead channel.

B. Transcoders

Figure 5:
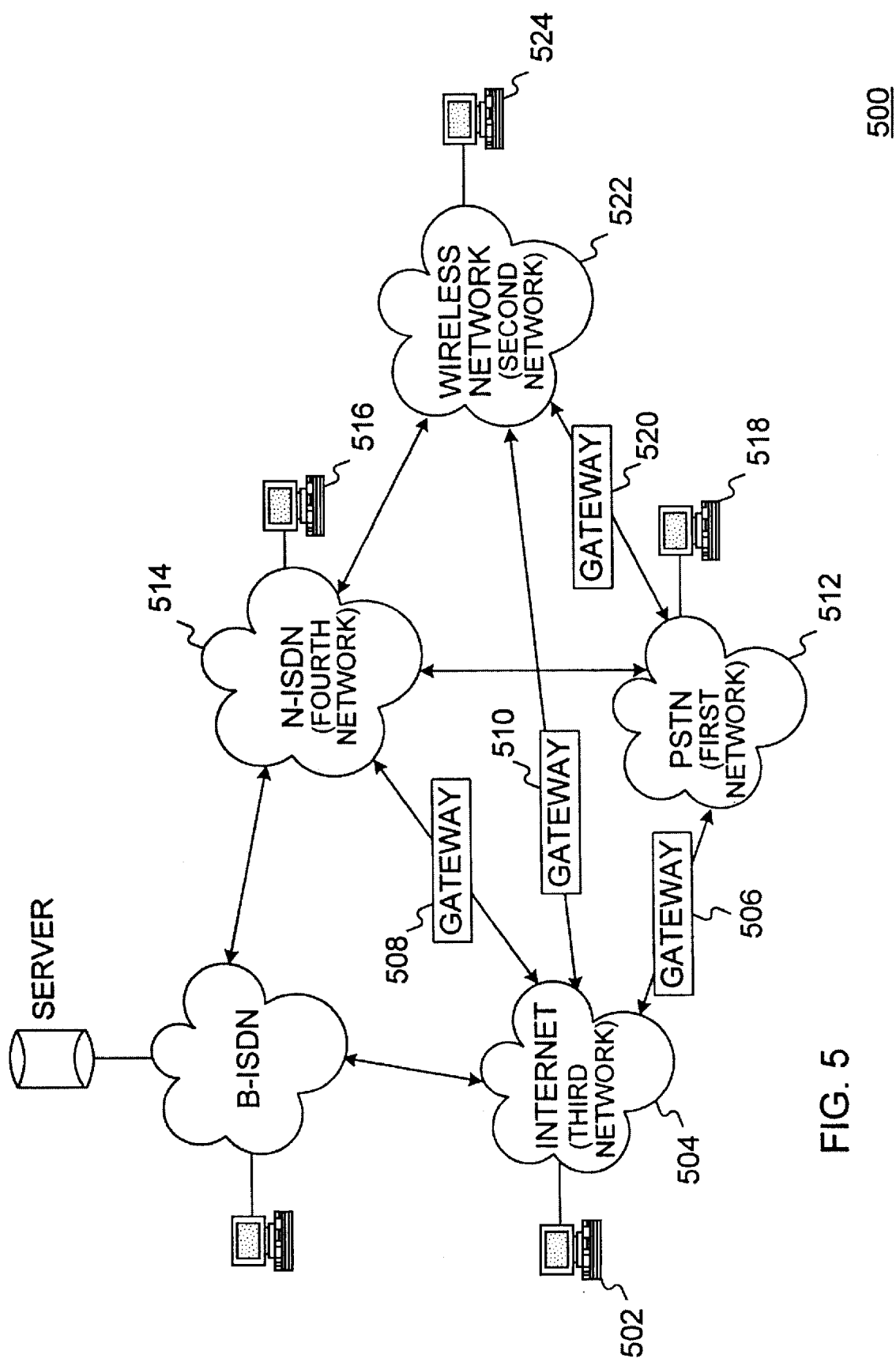
FIG. 5 is a diagram of the major components of an environment which may require transcoders.

Transcoders further compress, or reduce the bit rate, of encoded digital video signals. FIG. 5 is a diagram of the major components of an environment which may require transcoders. This environment 500 includes a network of different networks interconnected by gateways. A first network 512 is a public switched telephone network (PSTN) and a second network 522 is a wireless network. A first gateway 520 interconnects first network 512 and second network 522. First network 512 may have different characteristics than second network 522 and may provide its end-users with a different QoS. For instance, assume that first network 512 has a higher QoS than second network 522 and video is transmitted through gateway 520 from first network 512 to second network 522. Gateway 520 reduces the QoS, or bit-rate, of the video so that second network 522 can carry the video and deliver it to end-user 524. Gateway 520 employs a transcoder to reduce the bit rate.

A third network 504 is the Internet. A second gateway 506 connects first network 512 and third network 504 so that video can be delivered to end-user 502. A fourth network 514 is an N-ISDN. A third gateway 508 connects third network 504 and fourth network 514. A fourth gateway 510 connects third network 504 and second network 522. Each gateway employs a transcoder of some type.

Figure 6:
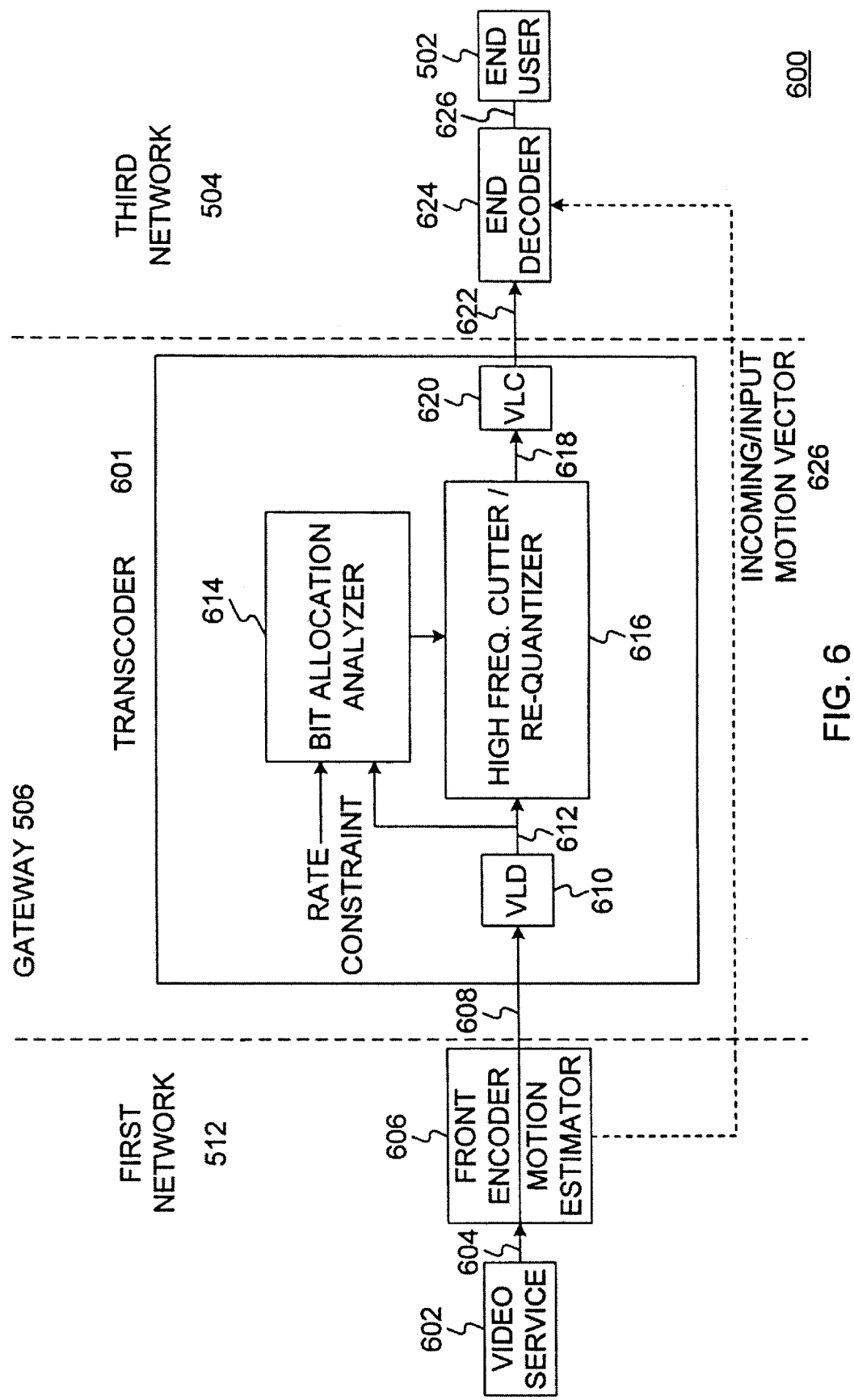
FIG. 6 is a diagram of an open-loop transcoder prevalent in the prior art.

FIG. 6 is a diagram of an open-loop transcoder 601, prevalent in the prior art. Transcoder 601 is part of second gateway 506 between first network 512 and third network 504. Video service 602 generates a digital video signal 604, which is encoded by front-encoder 606 using motion estimation. Front-encoder 606 generates an encoded video signal 608 and a motion vector signal 626. Encoded digital video 608 from first network 512 is supplied as input to transcoder 601. Input signal 608 first goes through a variable length decoder (VLD) 610, generating a second signal 612.

Although variable length decoding has taken place, second signal 612 is still in the "coded domain" because it has not yet gone through an inverse discrete cosine transform (IDCT), and a video image has not been reconstructed. Second signal 612 then goes through a process of high frequency cutting and requantization 616, generating a third signal 618. In this process 616, high frequency DCT coefficients are discarded and remaining DCT coefficients are requantized. Third signal 618 is variable length coded (VLC-ed) at 104, generating an encoded digital video output 622.

Encoded output 622 is at a lower bit rate than the encoded digital video input 608. The encoded digital video output 622 is prepared for third network 504. The amount and type of requantization and high-frequency cutting performed by process 616 is determined by a bit allocation analyzer 614, which considers the bit rate of second signal 612 and the needed rate constraint. In third network 504, the signal 622 is end-decoded 624 for end-user 502. End-decoder 624 uses the same motion vector signal 626 that front-encoder 606 generated and transmitted in an overhead channel. Open-loop transcoding, however, produces increased distortion caused by the drift due to the mismatched reconstructed pictures in the encoder and the decoder. This distortion may result in an unacceptable video quality in many applications.

Figure 7:
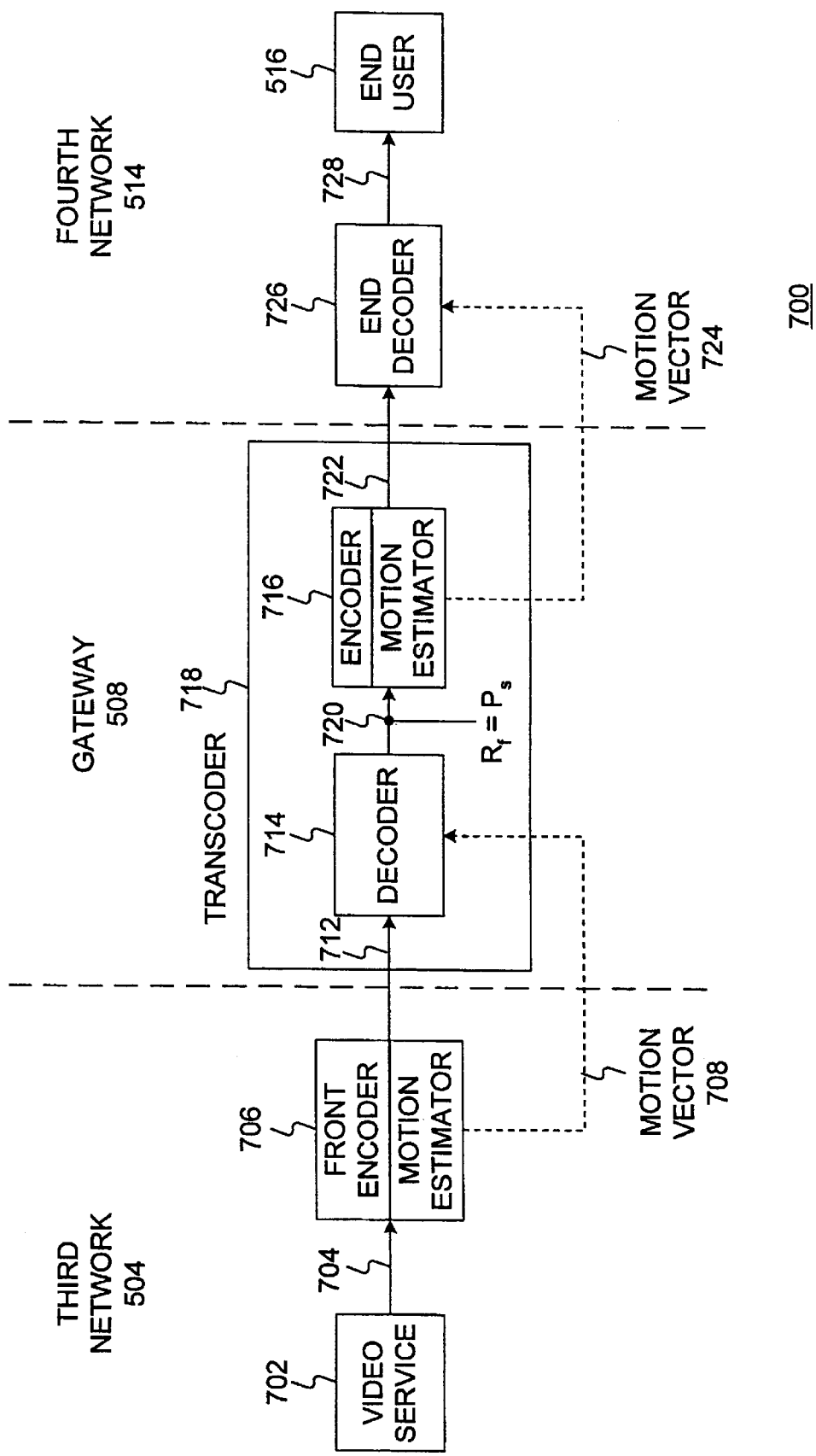
FIG. 7 is a diagram of a drift-free transcoder prevalent in the prior art.

FIG. 7 is a diagram of a drift-free transcoder 718 prevalent in the prior art. Transcoder 718 is part of third gateway 508 between third network 504 and fourth network 514. Video service 702 generates a digital video signal 704, which is encoded by front-encoder 706 using motion estimation. Front-encoder 706 generates an encoded video signal 712 and a motion vector signal 708. The input to transcoder 718 is encoded digital video 712 from third network 504. Transcoder 718 includes a cascaded decoder 714 and encoder 716. Transcoder 718 decodes the encoded digital video signal 712 in decoder 714 using motion vector signal 708 generated by front-encoder 706. Thus, the output of decoder 714 is an intermediate decoded video signal 720.

Encoder 716 takes intermediate digital video signal 720 and re-encodes it at a bit and frame rate suitable for fourth network 514. Encoder 716 performs an entirely new motion estimation and generates a new motion vector 724. Encoded video signal 722 leaving transcoder 718 is at a lower bit rate, and possibly a lower frame rate, than encoded digital video signal 712 entering transcoder 718. Encoded video signal 722 is transmitted through fourth network 514 to end-decoder 726. End-decoder 726 decodes second encoded video signal 722 into a decoded digital video signal 728, which may be viewed by end-user 516.

In transcoder 718, the intermediate signal 720 is considered as the original video signal for encoder 716 in transcoder 718. Encoder 716 is also known as a second-stage encoder 716. Thus, a motion vector MV2 from motion vector signal 724 for a macroblock in the second-stage motion estimation process is given by $$MV2 = arg \min_{(m,n) \in S} SAD_s(m, n)$$
$$= arg \min_{(m,n) \in S} \sum_i^M \sum_j^N |P_s^c(i, j) - R_s^p(i+m, j+n)|,$$

where the pixels of the previously reconstructed frame and the current frame in the second-stage encoder are $R_s^p(i,j)$ and $P_s^c(i,j)$, respectively. The subscript "s" indicates the second-stage encoder.

From FIG. 7, the reconstructed picture of the first-stage decoder $R_f$ is the same as the current picture of the second-stage encoder $P_s$, thus $$SAD_s(m, n) = \sum_i \sum_j |P_f^c(i, j) - R_f^p(i+m, j+n) + P_s^c(i, j) - P_f^c(i, j) + R_f^p(i+m, j+n) - R_s^p(i+m, j+n)|$$

$$= \sum_i \sum_j |P_f^c(i, j) - R_f^p(i+m, j+n) + R_f^c(i, j) - P_f^c(i, j) + P_s^p(i+m, j+n) - R_s^p(i+m, j+n)|$$

$$= \sum_i \sum_j |P_f^c(i, j) - R_f^p(i+m, j+n) + \Delta_f^c(i, j) - \Delta_s^p(i+m, j+n)|,$$

where $\Delta_f^c(i, j) = R_j^c(i, j) - P_f^c(i, j)$ and
$\Delta_s^p(i, j) = R_s^p(i, j) - P_s^p(i, j)$.

Here, $\Delta_f^c(i,j)$ represents the quantization error of the current frame in the first-stage encoding process, while $\Delta_s^p(i,j)$ represents the quantization error of the previous frame in the second-stage encoding process. Therefore, the motion vector is defined by the motion vector at the first-stage encoder and the quantization errors from the first and the second-stage encoders.

Figure 8:
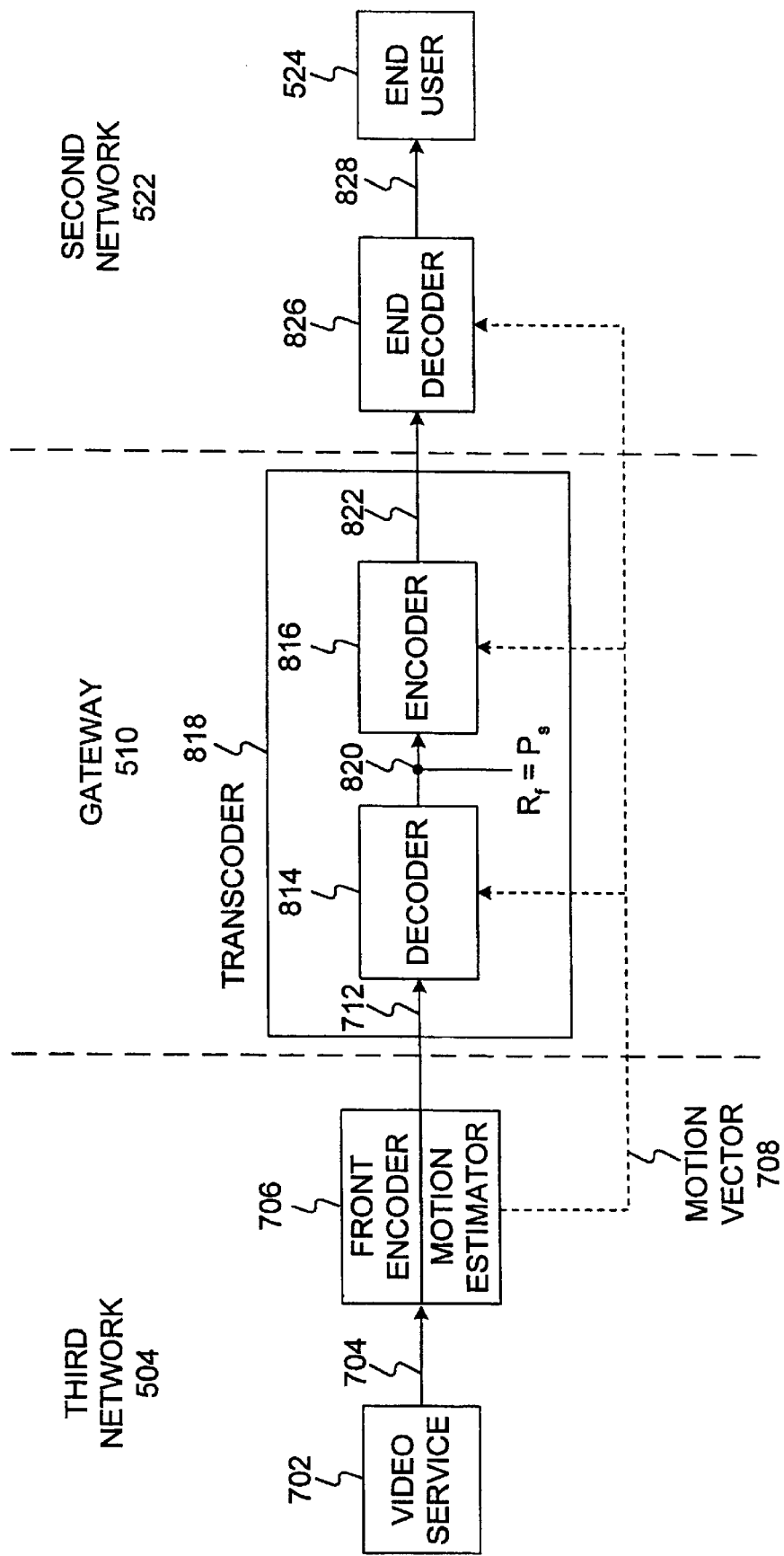
FIG. 8 is a diagram of a of a drift-free transcoder prevalent in the prior art.

The problem with transcoder 718, however, is that it is computationally complex and expensive to implement. To reduce the complexity, transcoders commonly reuse motion vector signal 708 from the overhead channel of the incoming encoded video 712. FIG. 8 is a diagram of a of a drift-free transcoder 818 that uses this method to overcome the computation problems of transcoder 718. Transcoder 818 is part of fourth gateway 510 between third network 504 and second network 522. Again, video service 702 generates digital video signal 704, which is encoded by front-encoder 706 using motion estimation. Front-encoder 706 generates encoded video signal 712 and motion vector signal 708. The input to transcoder 818 is encoded digital video 712 from third network 504. Transcoder 818 includes a cascaded decoder 814 and an encoder 816. Transcoder 818 decodes the encoded video signal 712 in decoder 814 using motion vector signal 708 generated by front-encoder 706. Thus, the output of decoder 814 is an intermediate decoded video signal 820.

Encoder 816 takes intermediate digital video signal 820 and re-encodes it with a bit and frame rate suitable for second network 522. Encoder 816 does not perform a new motion estimation. Instead, as an approximation it reuses motion vector signal 708 generated by front-encoder 706. Encoded video signal 822 leaving transcoder 818 is at a lower bit rate, and possibly a lower frame rate, than encoded video signal 712 entering transcoder 818. Encoded video signal 822 is transmitted through second network 522 to end-decoder 826. End-decoder 826 decodes encoded video signal 822 into a decoded video signal 828, which may be viewed by end-user 524.

Transcoder 818, however, introduces significant quality degradation in many applications. In analyzing this second prior art method, let (Ix, Iy) be a motion vector from motion vector signal 708 received during decoding 814 (i.e. received from the overhead channel). $SAD_s(Ix, Iy)$ with this motion vector can be represented as $$SAD_s(Ix, Iy) = \sum_i \sum_j |P_f^c(i, j) - R_f^p(i+Ix, j+Iy) + \Delta_f^c(i, j) - \Delta_s^p(i+Ix, j+Iy)| \leq SAD_f(Ix, Iy) + \sum_i \sum_j |\Delta_f^c(i, j) - \Delta_s^p(i+Ix, j+Iy)|.$$

If (Nx, Ny) is the optimized motion vector if a full-scale motion estimation were performed in the second-stage encoder 816, $SAD_s(Nx, Ny)$ by definition is the minimal value among all possible SADs. Thus, $$SAD_s(Nx, Ny) \leq SAD_s(Ix, Iy) \leq SAD_f(Ix, Iy) + \sum_i^M \sum_j^N |\Delta_f^c(i, j) - \Delta_s^p(i+Ix, j+Iy)|$$

is true. A quantity known as the Sum of the Differential Reconstruction Error (SDRE) can be defined as $$SDRE(Ix, Iy) = \sum_i^M \sum_j^N |\Delta_f^c(i, j) - \Delta_s^p(i+Ix, j+Iy)|.$$

This relation reveals that the reuse of the incoming motion vector signal 708 in encoder 816 and end-decoder 826 results in non-optimal motion vectors due to the differential quantization errors. This causes quality degradation. When the bit-rate of the transcoder output 822 is not significantly less than the bit-rate of the transcoder input 712, then the reuse of the incoming motion vectors may not cause significant quality degradation because the differential quantization errors and the SDRE are relatively small. When the difference in the bit-rate is not small, however, the quality degradation may be significant and more accurate motion vectors are desirable.

Figure 9:
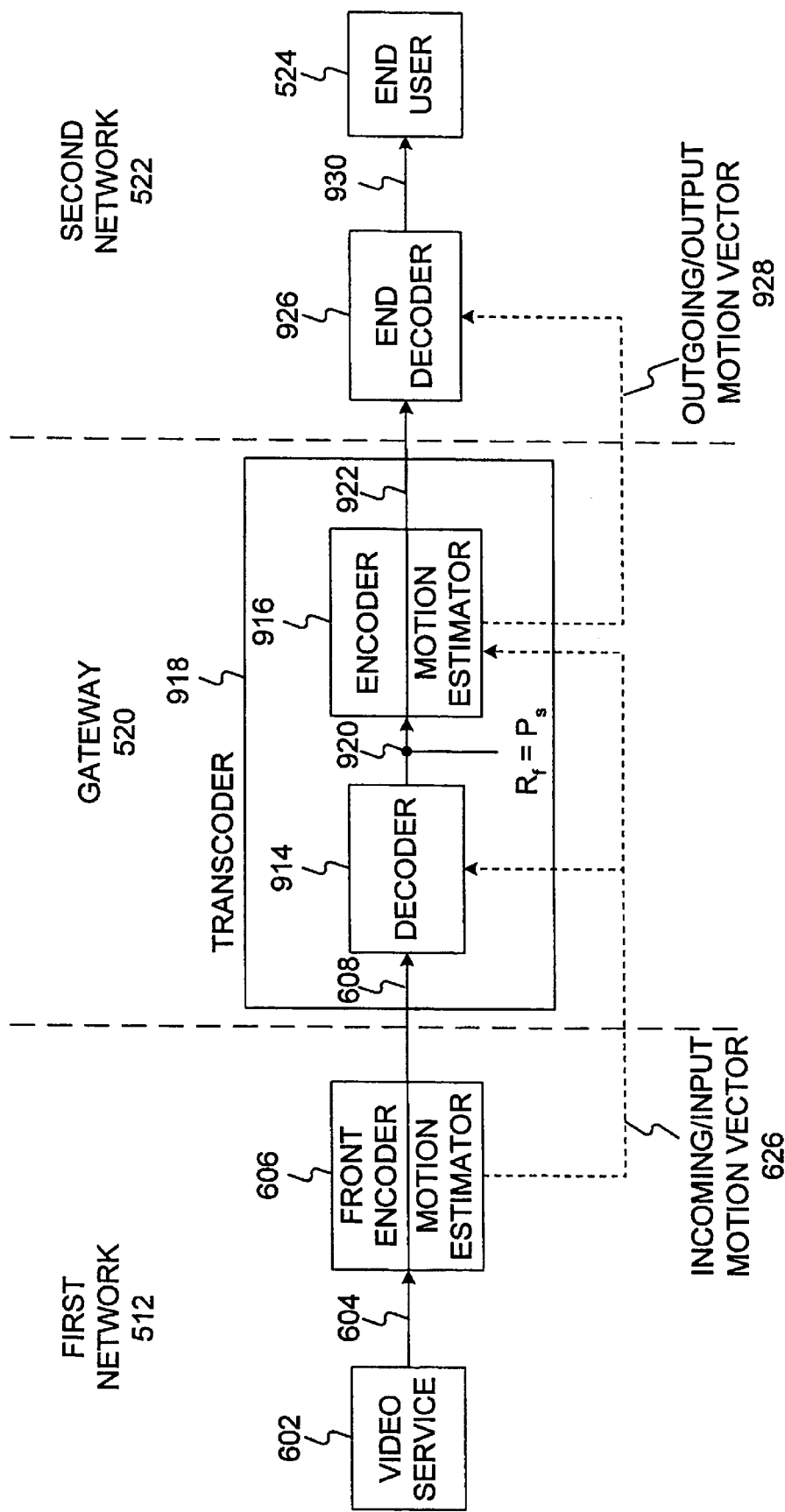
FIG. 9 is a diagram of a drift-free transcoder consistent with this invention.

From the above analysis of the known art, this invention may be understood. FIG. 9 is a diagram of a drift-free transcoder 918 consistent with this invention. Transcoder 918 may be part of first gateway 520 between first network 512 and second network 522. Again, video service 602 generates a digital video signal 604, which is encoded by front-encoder 606 using motion estimation. Front-encoder 606 generates an encoded video signal 608 and motion vector signal 626. The input to transcoder 918 is encoded digital video 608 from first network 512. Transcoder 918 includes a cascaded decoder 914 and encoder 916. Transcoder 918 decodes the encoded digital video signal 608 in decoder 914 using motion vector signal 626 generated by front-encoder 606. Thus, the output of decoder 914 is an intermediate decoded video signal 920.

Encoder 916 takes intermediate video signal 920 and re-encodes it at a bit and frame rate suitable for second network 522. Encoder 916 performs a refined motion estimation with motion vector signal 626 from front-encoder 606 as an input and generates a new motion vector signal 928. Encoded video signal 922 leaving transcoder 918 is at a lower bit rate, and possibly a lower frame rate, than encoded digital video signal 608 entering transcoder 918. Encoded video signal 922 is transmitted through second network 522 to end-decoder 926. End-decoder 926 decodes encoded video signal 922 into a decoded video signal 930, which may be viewed by end-user 524.

Now, the motion estimation of encoder 916 is explained. The differential quantization errors in transcoder 918 cause a perturbation in the position of the optimum motion vector for encoding intermediate signal 920. Therefore, instead of applying a fall-scale motion vector estimation or re-using the incoming motion vectors, methods and systems consistent with this invention use "motion vector refinement." Methods and systems consistent with this invention determine a base motion vector (Bx, By) from at least one incoming motion vector from motion vector signal 626 and generate a delta motion vector (Dx, Dy). Given the base and the delta motion vector, a new motion vector (Ox, Oy) that is part of motion vector signal 928 is the sum of the base motion vector and the delta motion vector, expressed by (Ox, Oy)=(Bx, By)+(Dx, Dy).

Here, let (Ix, Iy) be the current input motion vector from incoming motion vector signal 626 in the current frame. In the case where there is no frame skipping (described below), the base motion vector (Bx, By) is set equal to the input motion vector (Ix, Iy). This is represented by (Ox, Oy)=(Bx, By)+(Dx, Dy)=(Ix, Iy)+(Dx, Dy).

Given the base motion vector (Bx, By), the delta motion vector (Dx, Dy) is obtained within a much smaller search area S' than the search area S necessary for a full motion estimation technique used in transcoder 718 by encoder 716. Methods and systems consistent with this invention generate the delta motion vector by $$(Dx, Dy) = arg \min_{(m,n) \in S'} \sum_i^M \sum_j^N |P_s^c(i, j) - R_s^p(i + Bx + m, j + By + n)|.$$

The new motion vector (Ox, Oy) that is part of motion vector signal 928 is the sum of the base motion vector (Bx, By) and the delta motion vector (Dx, Dy). Methods and systems consistent with this invention re-encode the previously encoded video using the new motion vector. Calculation of new motion vector (Ox, Oy) is less computationally intensive than the calculations of transcoder 718 because of the smaller search area. Transcoder 918 also results in better video quality than the method of transcoder 818.

C. Transcoding and Frame Skipping

A technique known as "frame skipping" is prevalent in the prior art. The frame rate is measured in frames per second. Each frame is a still image, and displaying frames in quick succession creates the illusion of motion. The more frames per second, the smoother the motion appears. Frame skipping is a method of reducing the frame rate in order to allocate more bits to the remaining frames to maintain an acceptable image quality. Frame-skipping is also needed when an end-user only supports a lower frame-rate.

Figure 10:
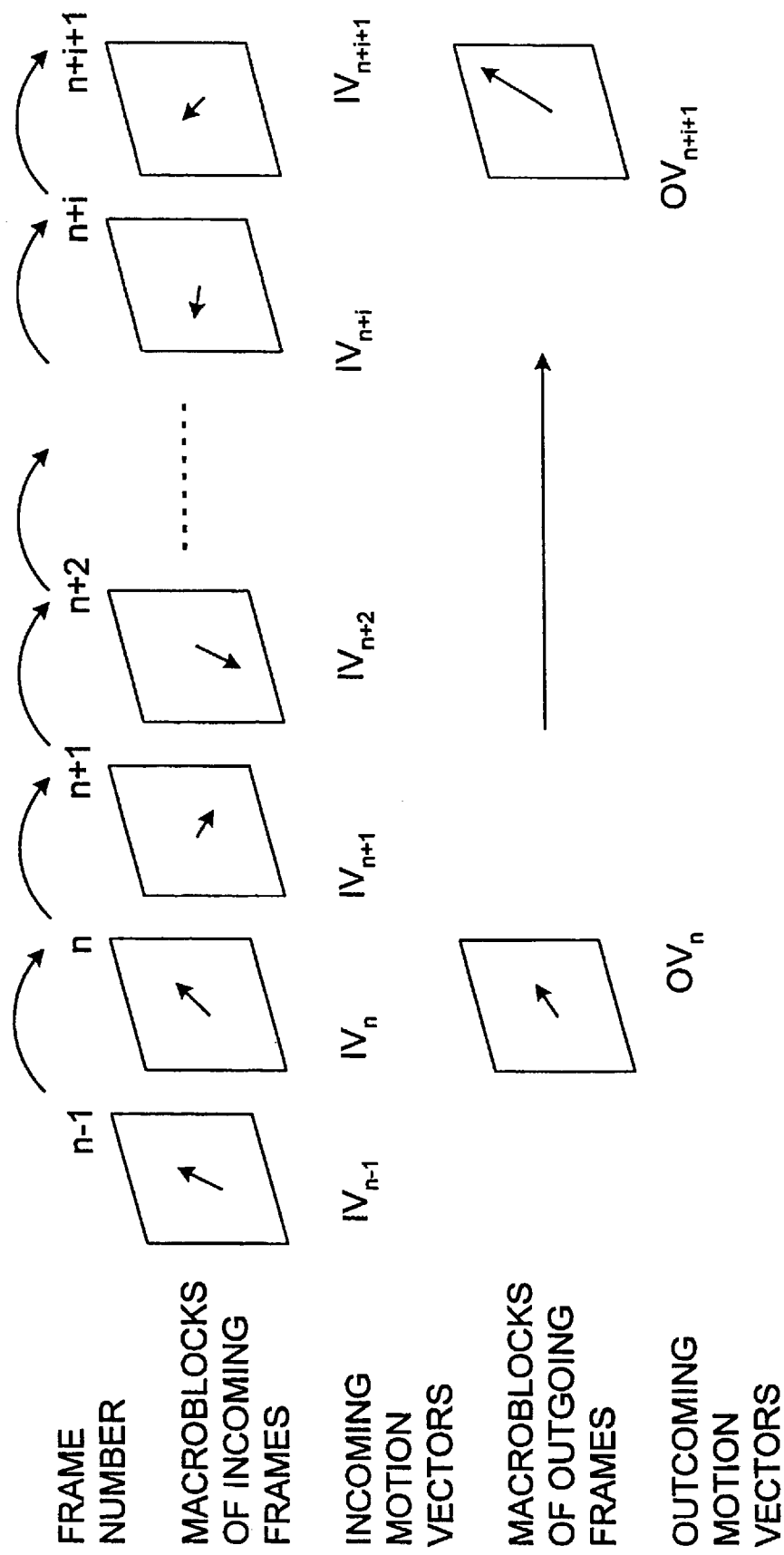
FIG. 10 is a diagram illustrating frame skipping consistent with this invention.

Methods and systems consistent with this invention may also employ frame skipping, i.e., transcoder 919 may perform a frame rate conversion by skipping frames. FIG. 10 is a diagram, consistent with this invention, showing motion vectors with frame-skipping. The frames between frame n and frame (n+i+1) are skipped. In the case of frame-skipping, the base motion vector (Bx, By) is determined by summing the incoming motion vectors from motion vector signal 626. For example, with the sequence of incoming motion vectors $(IV_{n+1}, IV_{n+2}, \ldots, IV_{n+i})$ as shown in FIG. 10, the base motion vector for the current (n+i+l) frame is derived by adding the current motion vector to the sum of the previous motion vectors since a previous determination of a different base motion vector. This is described by $$(Bx, By)_{n+i+1} = \sum_{k=1}^{i+1} IV_{n+k}.$$

This base motion vector, however, is non-optimal because the motion vectors $(IV_{n+1}, IV_{n+2}, \ldots, VI_{n+i})$ are non-optimal due to the quantization errors, as described above. In methods and systems consistent with this invention, the delta motion vector for the frame (n+i+1), $(Dx, DY)_{n+i+1}$ is determined by searching for a matching block in the n-th previous reference frame in the manner described above. Therefore, in methods and systems consistent with this invention, the outgoing motion vector with frame-skipping is obtained by $$OV_{n+i+1} = BV_{n+i+1} + DV_{n+i+1} = \sum_{k=1}^{i+1} (Ix, Iy)_{n+k} + (Dx, Dy)_{n+i+1}.$$

Figure 11:
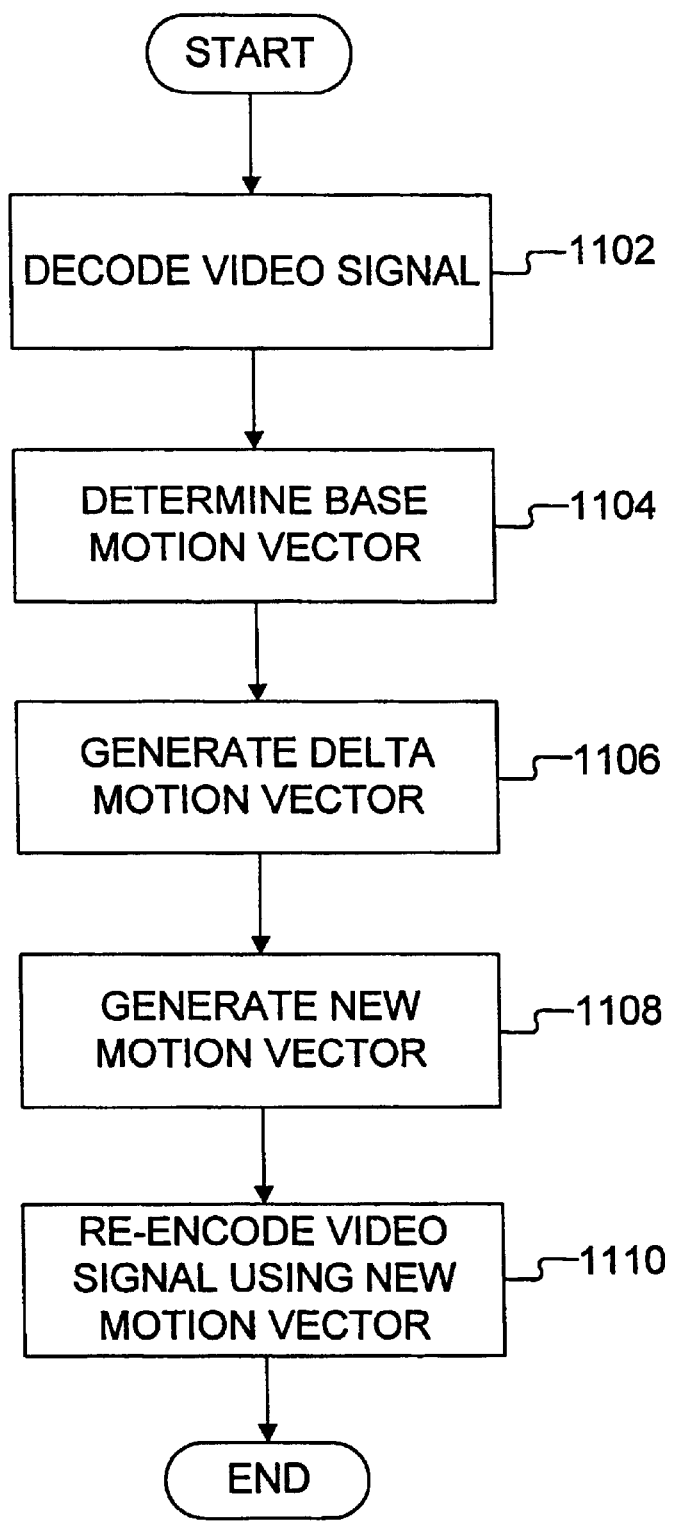
FIG. 11 is a flow chart, consistent with this invention, of a method for performing motion vector refinement with and without frame skipping.

FIG. 11 is a flow chart of a method, consistent with this invention, for performing motion vector refinement with or without frame skipping. First, the encoded video signal is decoded 608 (step 1102). Then the base motion vector (step 1104), which is dependent upon the input motion vector signal 626, is determined. The base motion vector determination may be different depending on whether there is frame skipping or not. In step 1106, a delta motion vector is generated and a new motion vector signal 928 (step 1108) is generated by summing the base and delta motion vectors, as explained above. Finally, at step 1110, the video signal is re-encoded using the new motion vector to generate an encoded video output 922.

Figure 12:
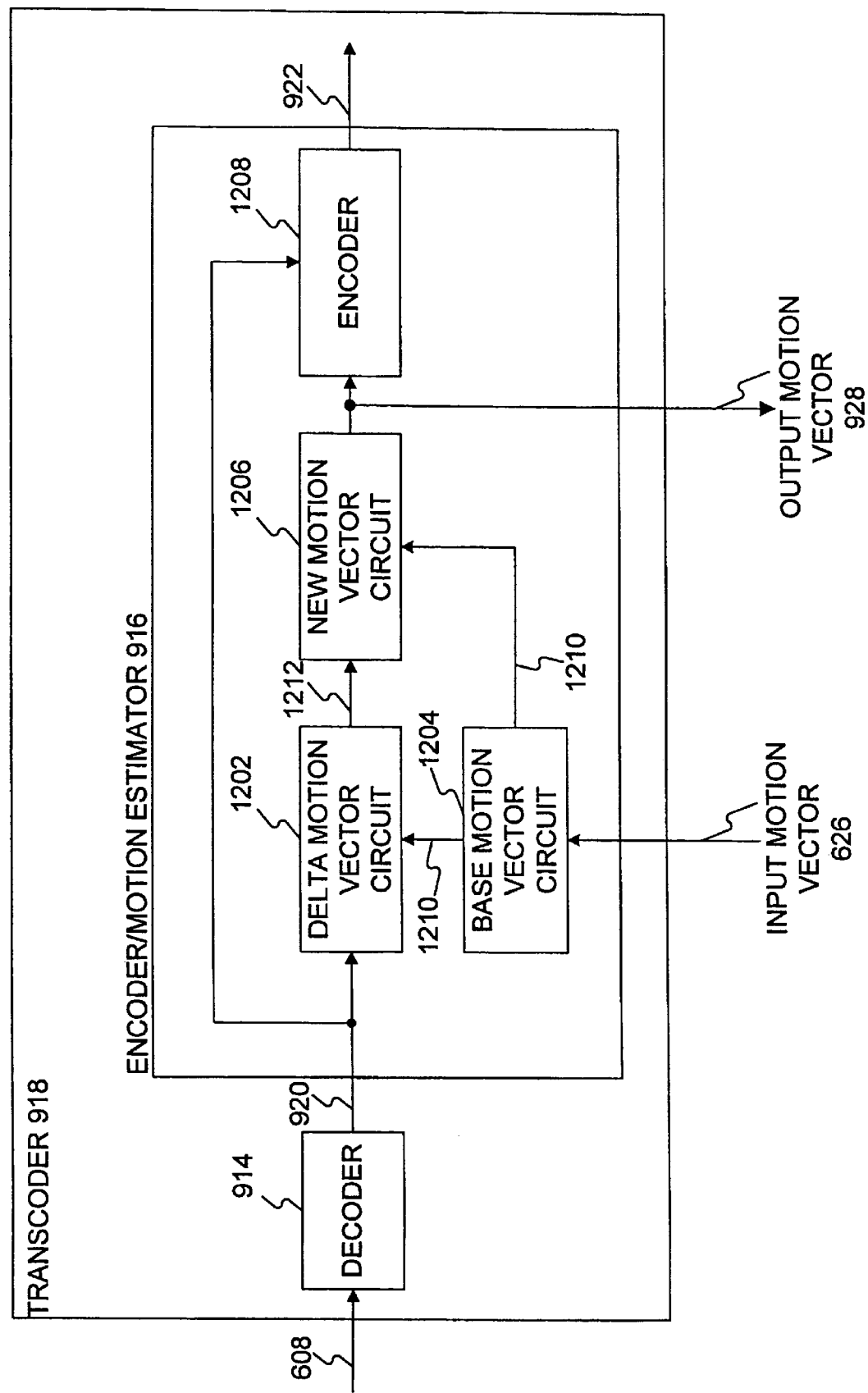
FIG. 12 is a block diagram of an apparatus, consistent with this invention, that performs motion vector refinement with or without frame skipping.

FIG. 12 is a block diagram of an apparatus, consistent with this invention, that performs motion vector refinement with or without frame skipping. Decoder 914 inputs encoded video signal 608 and outputs intermediate decoded video signal 920. A base motion vector circuit 1204 inputs motion vector signal 626 and outputs base motion vector signal 1210, which may be different depending whether there is frame skipping or not. A delta motion vector circuit 1202 inputs base motion vector signal 1210 and intermediate video signal 920 and generates a delta motion vector signal 1212. A new motion vector circuit 1206 inputs delta motion vector signal 1212 and base motion vector signal 1210 and sums them to generate new motion vector signal 928. An encoder 1208 inputs new motion vector signal 928 and intermediate video signal 920 and outputs encoded digital video signal 922.

Alternatively, delta motion vector circuit 1202, new motion vector circuit 1206, base motion circuit 1204, encoder 1208, and decoder 914 are implemented in a computer as instructions in a computer-readable medium.

D. Adaptive Motion Vector Refinement

Methods and systems consistent with this invention may further reduce the required computation of transcoder 919 by performing the motion vector refinement adaptively. The main cause of non-optimum motion vectors is the differential quantization errors, as shown above. In methods and systems consistent with this invention, when the SDRE(Bx, By) is small compared to SAD(Bx, By), the incoming motion vectors of motion vector signal 626 are near the optimum and the transcoder may not need to perform motion vector refinement.

The SDRE may be approximated in transcoder 918. When the difference between the quantization step-size used in the current frame of front-encoder 606 is small compared to the quantization step-size used in the previous frame of second encoder 916, then the SDRE is small. When the quantization step-size of second encoder 916 is much larger than that of front-encoder 606, the SDRE may be approximated as $$SDRE(Bx, By) \cong \sum_{i}^{M} \sum_{j}^{N} |\Delta_s^P(i + Bx, j + By)|,$$

from observing that the quantization error in the second encoder $\Delta_s^P(i+Bx,j+By)$ dominates the first quantization error $\Delta_f^c(i,j)$. Note that $\Delta_s^P(i+Bx,j+By)$ may be calculated exactly. Based on these observations, in the preferred embodiment, the SDRE may be approximated by $$SDRE(Bx, By) \cong \left| \left( \frac{q_1^2}{q_2^2} - 1 \right) \right| \sum_{i}^{M} \sum_{j}^{N} |\Delta_s^P(i + Bx, j + By)|$$

where $q_1$ is the quantization step-size use in the current frame of front-encoder 606 and $q_2$ is the quantization step-size used in the previous frame of second encoder 916. The complexity of this computation is similar to checking one search position in the motion estimation, so it does not require much new computation. In methods and systems consistent with this invention, if the estimated SDRE is smaller than a predetermined first threshold, then the motion vector refinement is not performed, and the incoming motion vector signal 626 is reused as the outgoing motion vector signal 928, i.e., the delta motion vector is set equal to zero.

When a motion vector from incoming motion vector signal 626 has a zero value, a predetermined higher second SDRE threshold can be used to prefer the reuse of the zero incoming motion vector signal 626 as the outgoing motion vector signal 928. In methods and systems consistent with this invention, if the motion vector from incoming motion vector signal 626 is zero and the estimated SDRE is smaller than a predetermined second threshold, then the motion vector refinement is not performed, i.e., the delta motion vector is set equal to zero and the incoming motion vector signal 626 is reused as the outgoing motion vector signal 928. Reuse of a zero motion vector is preferable because a non-zero motion vector will need more bits to code. In methods and systems consistent with this invention, reuse of the incoming motion vector signal 626 can be accomplished by setting the delta motion vector to zero.

In the case of frame-skipping, methods and systems consistent with this invention may also apply adaptive motion vector refinement. Also, often a large number of macroblocks are non-coded. In methods or systems consistent with this invention, these macroblocks are not subject to motion vector refinement.

Figure 13:
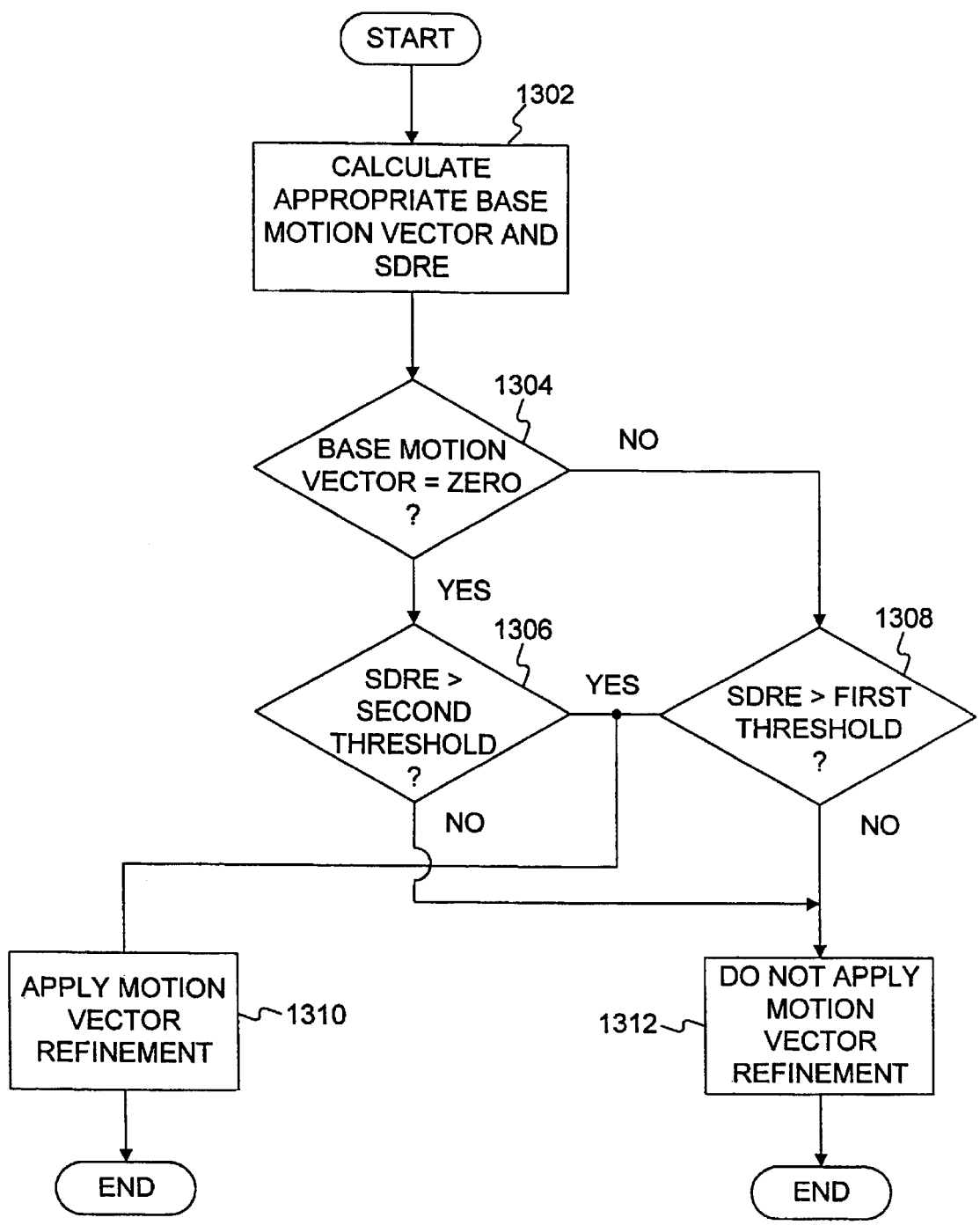
FIG. 13 is a flowchart of a method, consistent with this invention, for adaptively applying motion vector refinement.

FIG. 13 is a flow diagram, consistent with this invention, summarizing adaptive motion vector refinement. First, the appropriate base motion vector and SDRE are calculated (step 1302). If the base motion vector is zero (step 1304) and SDRE is greater than the second threshold (step 1306), then motion vector refinement is applied. If the base motion vector is zero (step 1304) and SDRE is not greater than the second threshold (step 1306), then motion vector refinement is not applied. If the base motion vector is not zero (step 1304) and SDRE is greater than the first threshold (step 1308), then motion vector refinement is applied. If the base motion vector is not zero (step 1304) and SDRE is not greater than the first threshold (step 1308), then motion vector refinement is not applied. In one embodiment, the first threshold and the second threshold are empirically set to 300 and 500, respectively.

Those skilled in the art recognize that various modifications and variations can be made in the preceding examples without departing from the scope or spirit of the invention. For example, this invention may be implemented in an environment other than a gateway connecting two networks. For instance, the invention could reside on a computer and be used to decrease the size of encoded video files, without transmitting the files. In this case, the invention would reside in a computer, not a gateway. Second, the invention is not limited to operation in hardware such as an application specific integrated circuit. The invention could be implemented using software.

Further, although the SAD function is used to find the optimal motion vector, other functions that are well known in the art may be used. Also, although adaptive motion vector refinement is used to decrease the bit rate of a digital video signal, nothing prohibits it from being used where the bit rate is not reduced.

The specification does not limit the invention. Instead, it provides examples and explanations to allow persons of ordinary skill to appreciate different ways to practice this invention. The following claims define the true scope and spirit of the invention.

What is claimed is:

1. A method of re-encoding digital video from a previously encoded digital video having at least one input motion vector, the method comprising the steps of:

determining a base motion vector from the at least one input motion vector;

generating a delta motion vector;

generating a new motion vector that is the sum of the base motion vector and the delta motion vector; and re-encoding the previously encoded digital video using the new motion vector.

2. The method of claim 1, wherein the at least one input motion vector includes a current motion vector, and wherein determining the base motion vector comprises determining the base motion vector equal to the current input motion vector.

3. The method of claim 1, wherein the at least one input motion vector includes a current input motion vector and at least one previous motion vector, and wherein determining the base motion vector comprises adding the current motion vector to the sum of the at least one previous motion vector since a previous determination of a different base motion vector.

4. The method of claim 1, wherein generating the delta motion vector comprises generating a delta motion vector (Dx, Dy) equal to:

$$\arg \min_{(m,n) \in S'} \sum_{i}^{M} \sum_{j}^{N} |P_s^c(i, j) - R_s^p(i + Bx + m, j + By + n)|$$

where:

Dx and Dy are components of the delta motion vector (Dx, Dy);

Bx and By are the components of the base motion vector (Bx, By);

$R_s^P(i,j)$ is the value of a pixel of a previous frame;

$P_s^c(i,j)$ is the value of a second pixel of the current frame;

i and j are the position of the pixel in a macroblock;

M and N are the maximum values of i and j, respectively;

min is a minimum function;

arg is an argument function;

S' is the area searched by the minimum function; and m and n are the arguments of the minimum function and are the components of a displacement vector (m, n).

5. The method of claim 1, comprising estimating a sum differential reconstruction error SDRE as:

$$\left|\left(\frac{q_1^2}{q_2^2} - 1\right)\right| \sum_i \sum_j |\Delta_s^p(i + Bx, j + By)|,$$

where:

$\Delta_s^P(i,j) = R_s^P(i,j) - P_s^P(i,j)$;

$R_s^P(i,j)$ is the value of a pixel of a previous frame;

$P_s^P(i,j)$ is the value of a second pixel of the previous frame;

$q_1$ is a quantization step-size used to encode a current frame in the previously encoded video;

$q_2$ is a quantization step-size used in re-encoding a previous frame;

Bx and By are the components of the base motion vector (Bx, By); and i and j are the position of the pixel in a macroblock.

6. The method of claim 5, wherein generating the delta motion vector includes generating a zero delta motion vector if the SDRE is less than a predetermined first threshold value and the base motion vector is not zero.

7. The method of claim 5, wherein generating the delta motion vector includes generating a zero delta motion vector if the SDRE is less than a predetermined second threshold value and the base motion vector is zero.

8. The method of claim 5, wherein generating the delta motion vector includes generating a zero delta motion vector if the SDRE is less than a predetermined first threshold value.

9. The method of claim 1, wherein generating the delta motion vector includes generating a zero delta motion vector if a macroblock is not coded.

10. The method of claim 1, wherein generating the delta motion vector includes generating a zero delta motion vector if the base motion vector is zero.

11. An apparatus for re-encoding digital video from a previously encoded digital video having at least one input motion vector, the apparatus comprising:

means for determining a base motion vector from the at least one input motion vector;

means for generating a delta motion vector;

means for generating a new motion vector that is the sum of the base motion vector and the delta motion vector; and means for re-encoding the previously encoded digital video using the new motion vector.

12. The method of claim 11, wherein the at least one input motion vector includes a current motion vector, and wherein means for determining the base motion vector comprises means for determining the base motion vector equal to the current input motion vector.

13. The apparatus of claim 11, wherein at least one input motion vector includes a current input motion vector and at least one previous motion vector, and wherein means for determining the base motion vector comprises means for adding the current motion vector to the sum of the at least one previous motion vector since a previous determination of a different base motion vector.

14. The apparatus of claim 11, wherein means for generating the delta motion vector comprises means for generating a delta motion vector (Dx, Dy) equal to:

$$\arg \min_{(m,n) \in S'} \sum_i^M \sum_j^N |P_s^c(i, j) - R_s^p(i + Bx + m, j + By + n)|$$

where:

Dx and Dy are components of the delta motion vector (Dx, Dy);

Bx and By are the components of the base motion vector (Bx, By);

$R_s^P(i,j)$ is the value of a pixel of a previous frame;

$P_s^c(i,j)$ is the value of a second pixel of the current frame;

i and j are the position of the pixel in a macroblock;

M and N are the maximum values of i and j, respectively;

min is a minimum function;

arg is an argument function;

S' is the area searched by the minimum function; and m and n are the arguments of the minimum function and are the components of a displacement vector (m, n).

15. The apparatus of claim 11, comprising means for estimating a sum differential reconstruction error SDRE as:

$$\left|\left(\frac{q_1^2}{q_2^2} - 1\right)\right| \sum_i \sum_j |\Delta_s^p(i + Bx, j + By)|,$$

where:

$\Delta_s^P(i,j) = R_s^P(i,j) - P_s^P(i,j)$;

$R_s^P(i,j)$ is the value of a pixel of a previous frame;

$P_s^P(i,j)$ is the value of a second pixel of the previous frame;

$q_1$ is a quantization step-size used to encode a current frame in the previously encoded video;

$q_2$ is a quantization step-size used in re-encoding a previous frame;

Bx and By are the components of the base motion vector (Bx, By); and i and j are the position of the pixel in a macroblock.

16. The apparatus of claim 15, wherein means for generating the delta motion vector includes means for generating a zero delta motion vector if the SDRE is less than a predetermined first threshold value and the base motion vector is not zero.

17. The apparatus of claim 15, wherein means for generating the delta motion vector includes means for generating a zero delta motion vector if the SDRE is less than a predetermined second threshold value and the base motion vector is zero.

18. The apparatus of claim 15, wherein means for generating the delta motion vector includes means for generating a zero delta motion vector if the SDRE is less than a predetermined first threshold value.

19. The apparatus of claim 11, wherein means for generating the delta motion vector includes means for generating a zero delta motion vector if a macroblock is not coded.

20. The apparatus of claim 11, wherein means for generating the delta motion vector includes means for generating a zero delta motion vector if the base motion vector is zero.

21. A computer-readable medium containing instructions for controlling a computer system to perform a method of operating a processor, the method comprising:

determining a base motion vector from at least one input motion vectors;

generating a delta motion vector;

generating a new motion vector that is the sum of the base motion vector and the delta motion vector; and re-encoding the previously encoded digital video using the new motion vector.

22. The computer-readable medium of claim 21, wherein the at least one input motion vector includes a current motion vector, and wherein determining the base motion vector comprises determining the base motion vector equal to the current input motion vector.

23. The computer-readable medium of claim 21, wherein the at least one input motion vector includes a current input motion vector and at least one previous motion vector, and wherein determining the base motion vector comprises adding the current motion vector to the sum of the at least one previous motion vector since a previous determination of a different base motion vector.

24. The computer-readable medium of claim 21, wherein generating the delta motion vector comprises generating a delta motion vector (Dx, Dy) equal to:

$$\arg\min_{(m,n)\in S'} \sum_i^M \sum_j^N |P_s^c(i,j) - R_s^p(i+Bx+m, j+By+n)|$$

where:

Dx and Dy are components of the delta motion vector (Dx, Dy);

Bx and By are the components of the base motion vector (Bx, By);

$R_s^p(i,j)$ is the value of a pixel of a previous frame;

$P_s^c(i,j)$ is the value of a second pixel of the current frame;

i and j are the position of the pixel in a macroblock;

M and N are the maximum values of i and j, respectively;

min is a minimum function;

arg is an argument function;

S' is the area searched by the minimum function; and m and n are the arguments of the minimum function and are the components of a displacement vector (m, n).

25. The computer-readable medium of claim 21, comprising estimating a sum differential reconstruction error SDRE as:

$$\left|\left(\frac{q_1^2}{q_2^2} - 1\right)\right| \sum_i \sum_j |\Delta_s^p(i+Bx, j+By)|,$$

where:

$\Delta_s^p(i,j) = R_s^p(i,j) - P_s^p(i,j)$;

$R_s^p(i,j)$ is the value of a pixel of a previous frame;

$P_s^p(i,j)$ is the value of a second pixel of the previous frame;

$q_1$ is a quantization step-size used to encode a current frame in the previously encoded video;

$q_2$ is a quantization step-size used in re-encoding a previous frame;

Bx and By are the components of the base motion vector (Bx, By); and i and j are the position of the pixel in a macroblock.

26. The computer-readable medium of claim 25, wherein generating the delta motion vector includes generating a zero delta motion vector if the SDRE is less than a predetermined first threshold value and the base motion vector is not zero.

27. The computer-readable medium of claim 25, wherein generating the delta motion vector includes generating a zero delta motion vector if the SDRE is less than a predetermined second threshold value and the base motion vector is zero.

28. The computer-readable medium of claim 25, wherein generating the delta motion vector includes generating a zero delta motion vector if the SDRE is less than a predetermined first threshold value.

29. The computer-readable medium of claim 21, wherein generating the delta motion vector includes generating a zero delta motion vector if a macroblock is not coded.

30. The computer-readable medium of claim 21, wherein generating the delta motion vector includes generating a zero delta motion vector if the base motion vector is zero.

31. An apparatus for re-encoding digital video from a previously encoded digital video signal having at least one input motion vector, the apparatus comprising:

a base motion vector circuit outputting a base motion vector from the at least one input motion vector;

a delta motion vector circuit outputting a delta motion vector;

a new motion vector circuit outputting a new motion vector that is the sum of the base motion vector and the delta motion vector; and an encoder for re-encoding the previously encoded digital video using the new motion vector.

32. The apparatus of claim 31, wherein the at least one input motion vector includes a current motion vector, and wherein the base motion vector circuit outputs the base motion vector equal to the current input motion vector.

33. The apparatus of claim 31, wherein the at least one input motion vectors includes a current input motion vector and at least one previous motion vector , and wherein the base motion vector circuit outputs the sum of the current motion vector to the sum of the at least one previous motion vector since a previous output of a different base motion vector.

34. The apparatus of claim 31, wherein the delta motion vector circuit outputs a delta motion vector (Dx, Dy) equal to:

$$\arg\min_{(m,n)\in S'} \sum_i^M \sum_j^N |P_s^c(i,j) - R_s^p(i+Bx+m, j+By+n)|$$

where:

Dx and Dy are components of the delta motion vector (Dx, Dy);

Bx and By are the components of the base motion vector (Bx, By);

$R_s^p(i,j)$ is the value of a pixel of a previous frame;

$P_s^c(i,j)$ is the value of a second pixel of the current frame;

i and j are the position of the pixel in a macroblock;

M and N are the maximum values of i and j, respectively;

min is a minimum function;

arg is an argument function;

S' is the area searched by the minimum function; and m and n are the arguments of the minimum function and are the components of a displacement vector (m, n).

35. The apparatus of claim 31, wherein the delta motion vector circuit calculates a sum differential reconstruction error SDRE as:

$$\left|\left(\frac{q_1^2}{q_2^2}-1\right)\right|\sum_i\sum_j|\Delta_s^P(i+Bx, j+By)|,$$

where:
$\Delta_s^P(i,j)=R_s^P(i,j)-P_s^P(i,j)$;
$R_s^P(i,j)$ is the value of a pixel of a previous frame;
$P_s^P(i,j)$ is the value of a second pixel of the previous frame;
$q_1$ is a quantization step-size used to encode a current frame in the previously encoded video;
$q_2$ is a quantization step-size used in re-encoding a previous frame;
Bx and By are the components of the base motion vector (Bx, By); and
i and j are the position of the pixel in a macroblock.

36. The apparatus of claim 35, wherein the delta motion vector circuit outputs a a zero delta motion vector if the calculated SDRE is less than a predetermined first threshold value and the base motion vector is not zero.

37. The apparatus of claim 35, wherein the delta motion vector circuit outputs a zero delta motion vector if the calculated SDRE is less than a predetermined second threshold value and the base motion vector is zero.

38. The apparatus of claim 35, wherein the delta motion vector circuit outputs a zero delta motion vector if the SDRE is less than a predetermined first threshold value.

39. The apparatus of claim 31, wherein the delta motion vector circuit outputs a zero delta motion vector if a macroblock is not coded.

40. The apparatus of claim 31, wherein the delta motion vector circuit outputs a zero delta motion vector if the base motion vector is zero.

* * * * *